(12) United States Patent
Huang et al.

(10) Patent No.: US 8,594,735 B2
(45) Date of Patent: Nov. 26, 2013

(54) CONFORMAL ANTENNA ARRAY

(75) Inventors: Howard C. Huang, New York, NY (US); Dragan M. Samardzija, Highlands, NJ (US); Reinaldo A. Valenzuela, Holmdel, NJ (US); Cuong Tran, Howell, NJ (US); Susan J. Walker, Freehold, NJ (US)

(73) Assignee: Alcatel Lucent, Paris (FR)

( * ) Notice: Subject to any disclaimer, the term of this patent is extended or adjusted under 35 U.S.C. 154(b) by 209 days.

(21) Appl. No.: 12/984,950

(22) Filed: Jan. 5, 2011

(65) Prior Publication Data
US 2012/0171972 A1 Jul. 5, 2012

(51) Int. Cl.
*H04B 1/38* (2006.01)

(52) U.S. Cl.
USPC .................................... 455/562.1; 455/550.1

(58) Field of Classification Search
USPC .............................. 455/562.1, 550.1; 343/702
See application file for complete search history.

(56) References Cited

U.S. PATENT DOCUMENTS

| 5,815,116 | A * | 9/1998 | Dunbridge et al. ........... 342/373 |
| 6,292,134 | B1 | 9/2001 | Bondyopadhyay |
| 2007/0210966 | A1* | 9/2007 | Thomas et al. ........ 343/700 MS |
| 2007/0257858 | A1 | 11/2007 | Liu |

FOREIGN PATENT DOCUMENTS

| EP | 0 777 400 | 6/1997 |
| EP | 1 041 670 | 10/2000 |

OTHER PUBLICATIONS

International Search Report and Written Opinion dated Apr. 10, 2012.

* cited by examiner

*Primary Examiner* — Lewis West
(74) *Attorney, Agent, or Firm* — Harness, Dickey & Pierce

(57) ABSTRACT

The present invention relates to a conformal antenna array. Embodiments of the present invention provide a transceiver for communicating data in a cell site of a wireless communication system. The transceiver includes the conformal antenna array including a plurality of antenna elements, where the plurality of antenna elements has a non-linear antenna configuration to occupy at least two dimensions, and a controller configured to transmit multiple beamforming signals using at least two same antenna elements of the plurality of antenna elements.

18 Claims, 8 Drawing Sheets

FIG. 3A
FIG. 3B
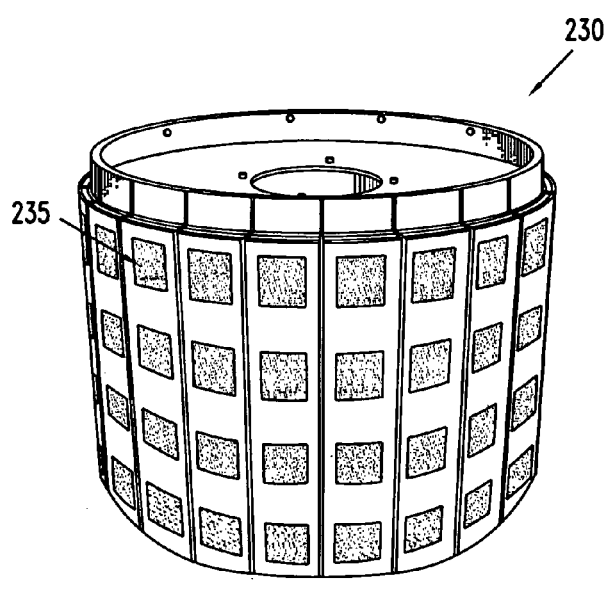
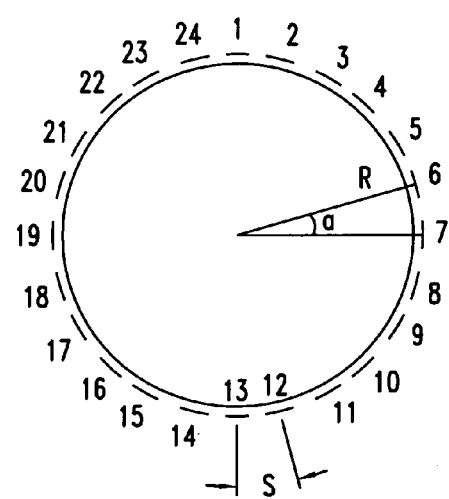

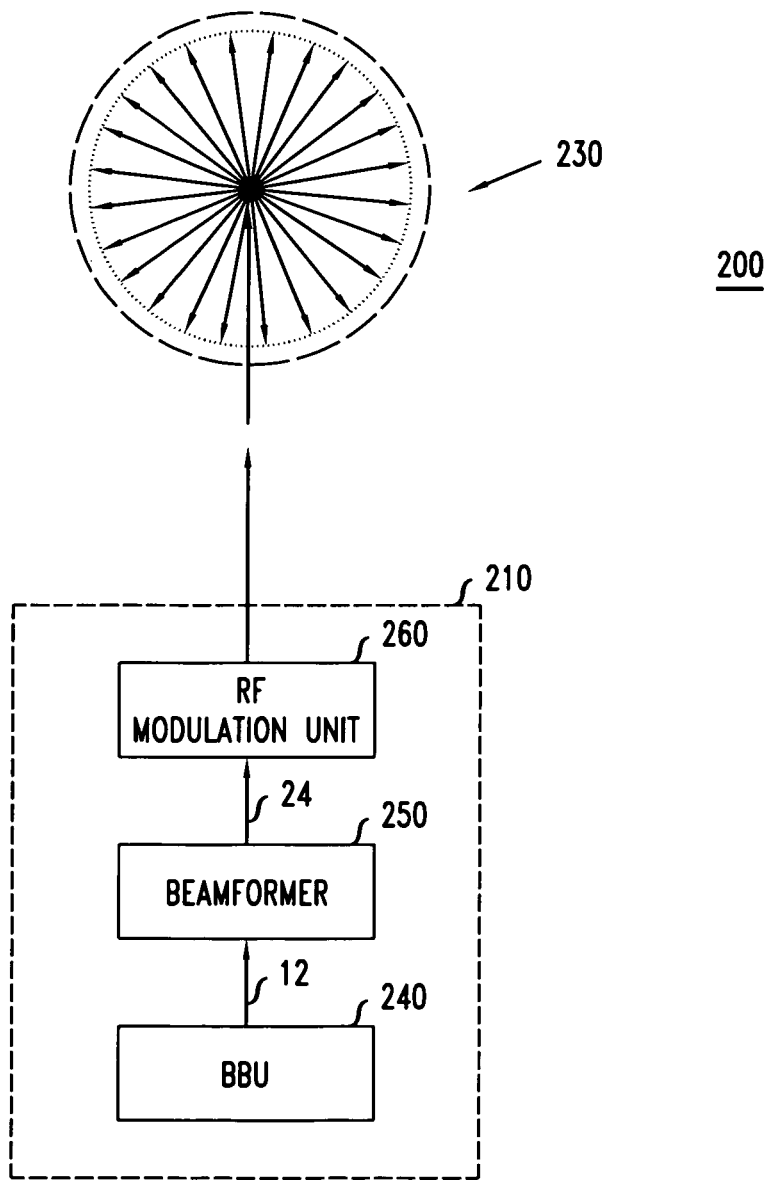

FIG. 8

CONFORMAL ANTENNA ARRAY

BACKGROUND

Spatial processing such as multiple-input and multiple-output (MIMO) techniques are important for improving the performance of wireless systems. In environments with low angle spread, higher-order sectorization has been shown to be effective for increasing throughput. More generally, user-specific beamforming can be used to multiplex signals for different users.

However, the problem is to achieve higher-order sectorization or user-specific beamforming with an efficient and visually unobtrusive antenna architecture. Conventional solutions use antenna elements arranged in a linear array. For sectorization, each sector is created using a single linear antenna array where the sector size is inversely proportional to the width of the array. As a result, a large number of wide panels is required for higher-order sectorization. Also, for user-specific beamforming, beam patterns that are far from the boresight direction of the antenna elements have poor radiation pattern characteristics.

Due to the physical implementation of the conventional linear array, the conventional architecture imposes restrictions on the installation and deployment, potentially creating a visually obtrusive object.

SUMMARY

The present invention relates to a conformal antenna array.

Embodiments of the present invention provide a transceiver for communicating data in a cell site of a wireless communication system. The transceiver includes the conformal antenna array including a plurality of antenna elements, where the plurality of antenna elements has a non-linear antenna configuration to occupy at least two dimensions, and a controller configured to transmit multiple beamforming signals using at least two same antenna elements of the plurality of antenna elements.

The non-linear antenna configuration may be a circular configuration and the plurality of antenna elements are arranged on a surface of a cylinder. Also, the non-linear antenna configuration may be a hemispherical configuration, or an antenna configuration that conforms to a deployment area. Also, the plurality of antenna elements may be arranged in at least two different non-linear antenna configurations that are controlled by one controller.

In one embodiment, spacing between adjacent antenna elements may be no greater than half of a wavelength. Also, each beamforming signal may be associated with a different sector in the cell site, and a number of beamforming signals may correspond to a number of sectors.

The controller may include a baseband unit configured to generate baseband signals, and a beamformer unit configured generate the multiple beamforming signals based on the baseband signals, where each beamforming signal includes a set of radio-frequency (RF) signals corresponding to a sub-set of antenna elements of the plurality of antenna elements. Each baseband signal may be associated with a different sector in the cell site. At least two beamforming signals generated from the beamformer unit may use at least two of the same antenna elements in the sub-set.

Also, the beamformer unit may be configured to generate a beamforming signal based on beamforming coefficients and a respective baseband signal, where each beamforming coefficient corresponds to a different antenna element in the subset. The beamformer unit may multiply the respective baseband signal with each beamforming coefficient to generate the RF signals included in one beamforming signal. Also, the transceiver may include an RF modulation unit configured to modulate the RF signals from the beamformer unit to a particular frequency band.

According to another embodiment, the transceiver includes a conformal antenna array that has a plurality of antenna elements, where the plurality of antenna elements has a non-linear antenna configuration to occupy at least two dimensions. The transceiver also includes a baseband unit configured to generate baseband signals, and a beamformer unit configured to generate multiple beamforming signals based on the baseband signals, where each beamforming signal includes a set of radio-frequency (RF) signals corresponding to a sub-set of antenna elements of the plurality of antenna elements. The beamformer unit may be configured to transmit at least two beamforming signals using at least two of the same antenna elements in the sub-set.

The non-linear antenna configuration may be a circular configuration and the plurality of antenna elements are arranged on a surface of a cylinder. Also, the non-linear antenna configuration may be a hemispherical configuration, or an antenna configuration that conforms to a deployment area. Also, the plurality of antenna elements may be arranged in at least two different non-linear antenna configurations that are controlled by one controller.

BRIEF DESCRIPTION OF THE DRAWINGS

Example embodiments will become more fully understood from the detailed description given herein below and the accompanying drawings, wherein like elements are represented by like reference numerals, which are given by way of illustration only and thus are not limiting of the present invention, and wherein:

FIG. 3A illustrates the conformal antenna array having a circular antenna configuration according to an embodiment of the present invention;

FIG. 3B illustrates a graphical representation of the conformal antenna array having the circular antenna configuration according to an embodiment of the present invention;

FIG. 6 illustrates a transceiver having the conformal antenna array for transmitting data on a downlink communication channel according to an embodiment of the present invention;

Figure 8:
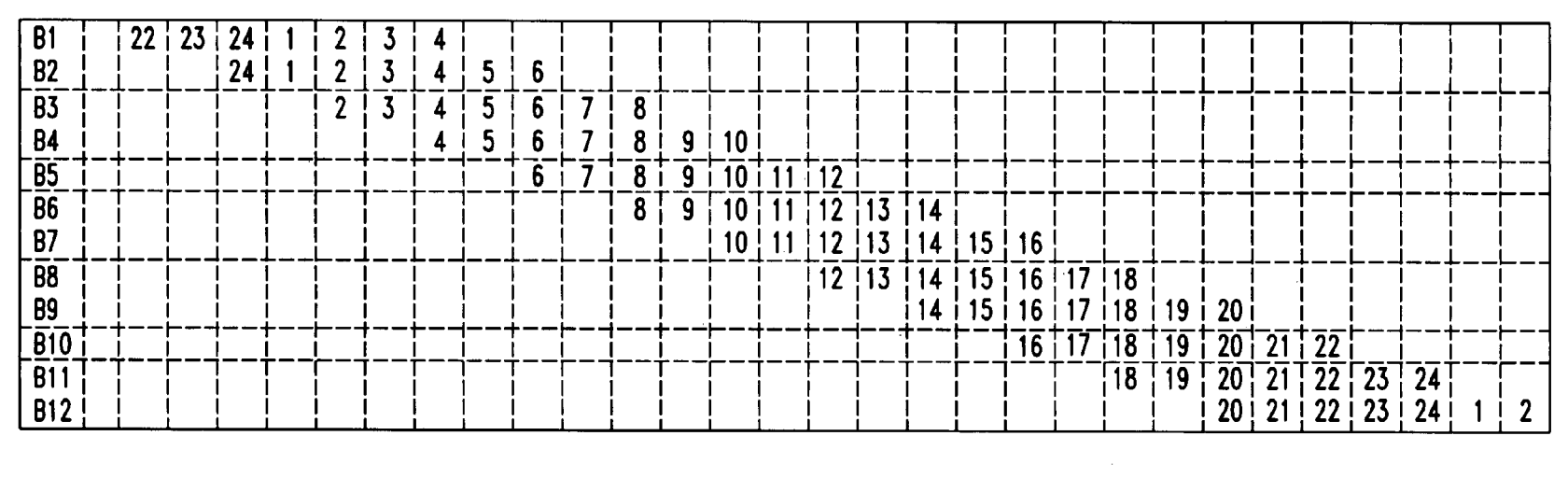

FIG. 8 illustrates an antenna element mapping chart according to an embodiment of the present invention.

DETAILED DESCRIPTION OF EXAMPLE EMBODIMENTS

Figure 1:
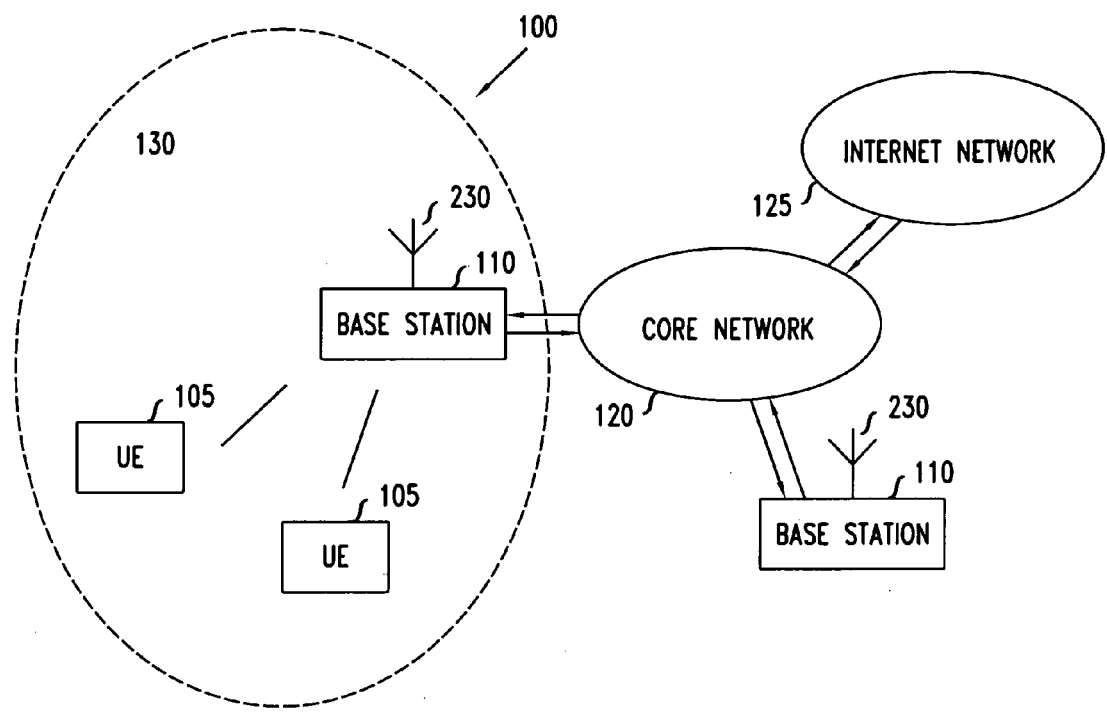
FIG. 1 illustrates a system for implementing a conformal antenna array according to an embodiment of the present invention.

Various example embodiments of the present invention will now be described more fully with reference to the accompanying drawings in which some example embodiments of the invention are shown. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

In the following description, illustrative embodiments will be described with reference to acts and symbolic representations of operations (e.g., in the form of flowcharts) that may be implemented as program modules or functional processes include routines, programs, objects, components, data structures, etc., that perform particular tasks or implement particular abstract data types and may be implemented using existing hardware at existing network elements. Such existing hardware may include one or more Central Processing Units (CPUs), digital signal processors (DSPs), application-specific-integrated-circuits, field programmable gate arrays (FPGAs), computers or the like.

It should be borne in mind, however, that all of these and similar terms are to be associated with the appropriate physical quantities and are merely convenient labels applied to these quantities. Unless specifically stated otherwise, or as is apparent from the discussion, terms such as "acquiring" or "determining" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

The term "base station" may be considered synonymous to and/or referred to as a base transceiver station (BTS), NodeB, extended NodeB, evolved NodeB, femto cell, pico cell, access point, etc. and may describe equipment that provides the radio baseband functions for data and/or voice connectivity between a network and one or more user equipments. The term "user equipment" may be considered synonymous to, and may hereafter be occasionally referred to, as a mobile, mobile unit, mobile station, mobile user, subscriber, user, remote station, access terminal, receiver, etc., and may describe a remote user of wireless resources in a wireless communication network.

Unlike the conventional linear array, embodiments of the present invention provide a conformal antenna array that may be adapted to a plurality of different antenna configurations such as a general antenna configuration with arbitrary antenna element spacing, a circular antenna configuration, a hemispherical antenna configuration, and an antenna configuration that conforms to its deployment area, for example. The conformal antenna array includes antenna elements having a non-linear antenna configuration to occupy at least two dimensions. In order to allow higher-order sectorization in a wide variety of antenna structures, the conformal antenna array transmits multiple beamforming signals (e.g., one beamforming signal for each sector in a cell site) over at least two of the same antenna elements. In other words, the conformal antenna array re-uses existing antenna elements for multiple beamforming signals. As a result, the conformal antenna array, coupled with an appropriate beamforming algorithm, results in efficient radiation pattern characteristics for higher-order sectorization or user-specific beamforming, which is further explained below.

FIG. 1 illustrates a system for implementing the conformal antenna array according to an embodiment of the present invention.

Referring to FIG. 1, the wireless communication system 100 includes user equipments (UEs) 105, base stations 110, a core network 120, and an Internet network 125. In addition, the wireless communication system 100 may include other networking elements used for the transmission of data over the wireless communication system 100 that are well known in the art. The base station 110 may be a multi-standard base station (MBS), which includes modules that support a plurality of different wireless standards such as Global System for Mobile Communications (GSM), Code Division Multiple Access (CDMA)/High Speed Packet Access (HSPA), Long Term Evolution (LTE), and/or CDMA/LIE, among others, for example.

Each UE 105 communicates with the base station 110 (and vice versa) over an air interface. Techniques for establishing, maintaining, and operating the air interfaces between the UEs 105 and the base station 110 to provide uplink and/or downlink wireless communication channels between the base station 110 and the UEs 105 are known in the art and in the interest of clarity only those aspects of establishing, maintaining, and operating the air interfaces that are relevant to the present disclosure will be discussed herein.

A cell site 130 may serve a coverage area of the base station 110 called a cell, and the cell may be divided into a number of sectors. For ease of explanation, the terminology cell may refer to either the entire coverage area served by the cell site 130 or a single sector of the cell site 130. Communication from the cell site 130 of the base station 110 to the UE 105 is referred to as the forward link or downlink. Communication from the UE 105 to the cell site 130 of the base station 110 is referred to as the reverse link or uplink.

The base station 110 may transmit and receive information from a core network 120, which is the central part of the wireless communication network 100. For example, in UMTS, the core network 120 may include a mobile switching center (MSC), a radio network controller (RNC), which may access the internet network 125 through a gateway support node (GSN) and/or access a public switched telephone network (PSTN) through a mobile switching center (MSC) to provide connectivity to the other base station 110. The RNC in UMTS networks provide functions equivalent to the Base Station Controller (BSC) functions in GSM networks.

The base station 110 includes a transceiver for transmitting and/or receiving information over the air interfaces. The transceiver may include a conformal antenna array 230 and a controller for transmitting multiple beamforming signals using at least two of the same antenna elements. As explained above, the conformal antenna 230 array may be adapted to a plurality of different antenna configurations such as a general antenna configuration with arbitrary antenna element spacing (FIG. 2), a circular antenna configuration (FIGS. 3A and 3B), a hemispherical antenna configuration (FIG. 4), and an antenna configuration that conforms to its deployment area (FIG. 5), for example. The details of the transceiver and the controller are illustrated in FIGS. 6-8 of the present invention.

Figure 2:
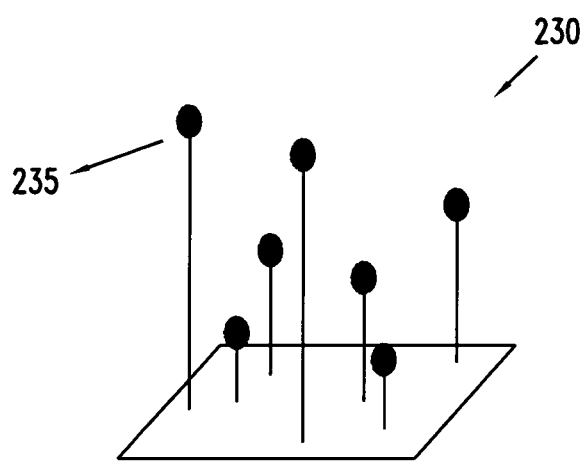
FIG. 2 illustrates the conformal antenna array having a general antenna structure according to an embodiment of the present invention.

FIG. 2 illustrates the conformal antenna array 230 having a general antenna structure according to an embodiment of the present invention. For example, the conformal antenna array 230 includes a plurality of antenna elements 235 having a non-linear configuration to occupy three dimensions. The arrangement of the antenna elements 235 is arbitrary as well as the spacing between each of the antenna elements 235. Also, although not shown in FIG. 2, the antenna elements 235 of the conformal antenna array 230 may be arranged into a plurality of groups such as two panels that are arranged on a corner area of building, or any other type of non-linear grouping.

FIG. 3A illustrates the conformal antenna array 230 having a circular antenna configuration according to an embodiment of the present invention, FIG. 3B illustrates a graphical representation of the conformal antenna array 230 having the circular antenna configuration according to an embodiment of the present invention. As shown in FIG. 3A, the conformal antenna array 230 includes antenna elements 235 having a non-linear configuration that are arranged on the surface of a cylinder. Referring to FIG. 3B, the conformal antenna array 230 may include twenty-four (24) antenna elements 235 arranged in a circular manner. In this embodiment, the maximum distance (S) between adjacent antenna elements 235 is no greater than half the carrier's wavelength. When the element spacing approaches half of the carrier's wavelength, the non-linear arrangement may approach a two-dimensional manifold. In other words, at a small enough scale, the antenna elements 235 of the circular configuration may occupy two dimensions. In addition, the array radius (R) of the circular configuration may be 2.17λ, and the angle (a) may be 15 degrees. In this particular example, the 24 antenna elements 235 may be used to electronically generate 12 beamforming signals, which use overlapping antenna elements, as further described with reference to FIGS. 6-8 of the present invention.

Figure 4:
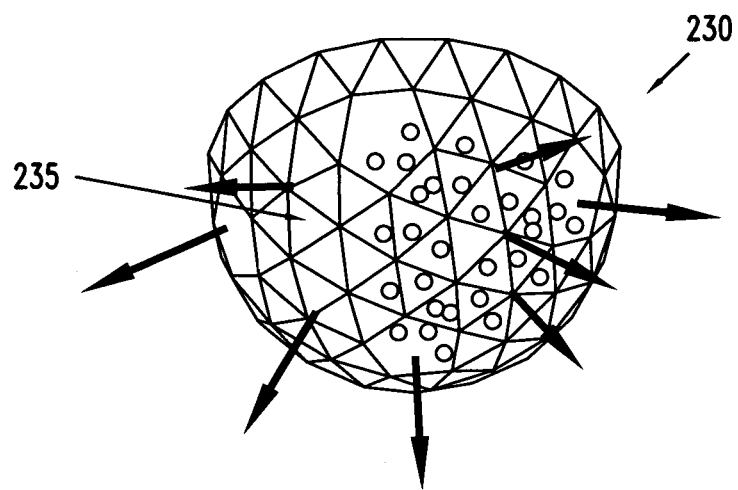
FIG. 4 illustrates the conformal antenna array having a hemispherical antenna configuration according to an embodiment of the present invention.

FIG. 4 illustrates the conformal antenna array 230 having a hemispherical antenna configuration according to an embodiment of the present invention. In FIG. 4, the antenna elements 235 have a non-linear configuration, which are arranged on a surface of a hemisphere. Similar to the circular antenna configuration, the hemispherical antenna configuration may be used to generate multiple beamforming signals using the same antenna elements. Also, the maximum distance (S) between adjacent antenna elements 235 of the hemispherical antenna configuration is no greater than half the carrier's wavelength.

Figure 5:
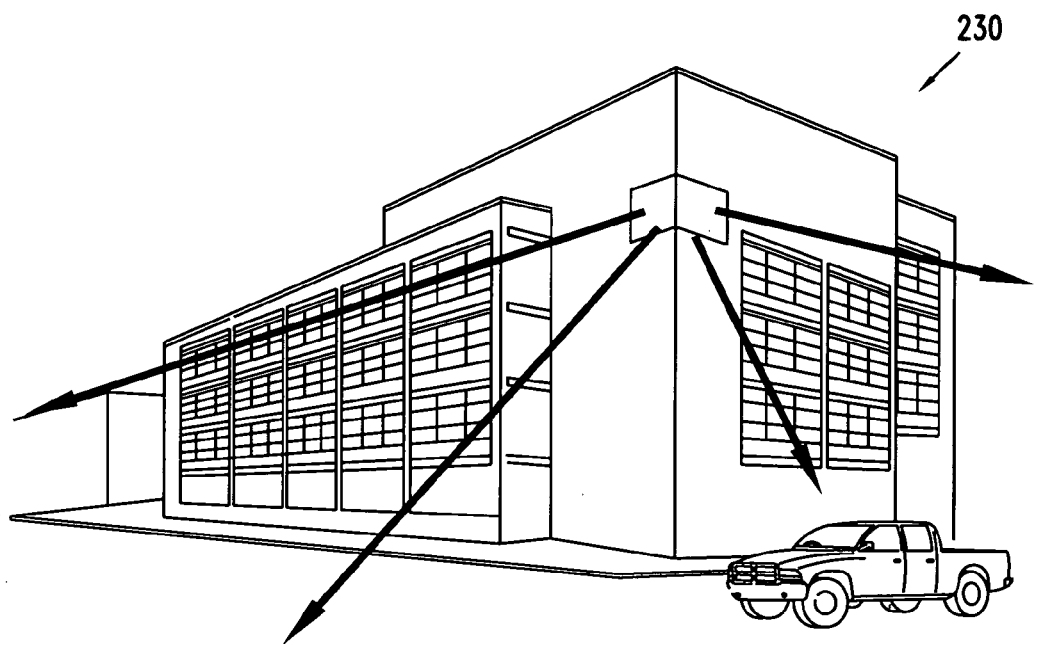
FIG. 5 illustrates the conformal antenna array having an antenna configuration that conforms to a deployment area according to an embodiment of the present invention.

FIG. 5 illustrates the conformal antenna array 230 having a non-linear antenna configuration that conforms to a deployment area according to an embodiment of the present invention. The deployment area is the area where the conformal antenna array 230 is located. Referring to FIG. 5, the antenna configuration conforms to a corner area of a building. The antenna elements 235 are arranged on two panels on each side of the building forming the corner. Similar to the circular antenna configuration and the hemispherical antenna configuration, the antenna configuration of FIG. 5 may be used to generate multiple beamforming signals using the same antenna elements. Also, the maximum distance (S) between adjacent antenna elements 235 of the antenna configuration of FIG. 5 is no greater than half the carrier's wavelength.

Also, embodiments of the present invention encompass a malleable antenna array 230 that is a single antenna array, which is molded or configured into at least two different antenna configurations. For example, the antenna elements 235 may be divided into two different groups, where each group of antenna elements 235 support a different antenna configuration. However, embodiments of the present invention encompass any number of antenna configurations using a single antenna array. The malleable antenna array 230 having the multiple antenna configuration may be driven by a single radio frequency (RF) unit, which is further explained with reference to FIG. 6 of the present invention.

The transceiver including the conformal antenna array 230 is configured to transmit multiple beamforming signals using the antenna elements 235. For example, the transceiver implements a beamforming scheme, which is a signal processing technique used to control the directionality of the reception or transmission of a signal on the conformal antenna array 230. The beamforming signals, which are the result of the beamforming scheme, may be adaptive signals that may vary in direction and beamwidth, or may be fixed beams. In either case, the transceiver may generate multiple beamforming signals (e.g., one beamforming signal for each sector) using the conformal antenna array 230. Embodiments of the present invention encompass any type of beamforming technique that is well known in the art. However, according to embodiments of the present invention, the antenna elements 235 are reused when transmitting multiple beamforming signals over the conformal antenna array 230 in order to create a more compact, flexible antenna array.

FIG. 6 illustrates a transceiver 200 having the conformal antenna array 230 for transmitting data on a downlink communication channel according to an embodiment of the present invention.

The transceiver 200 may include the conformal antenna array 230 including the antenna elements 235 and a central controller 210 for controlling the antenna array 230 and generating the beamforming signals over the antenna elements 235. The central controller 210 includes a baseband unit (BBU) 240, a beamformer unit 250, and an RF modulation unit 260. The central controller 210 also may include other components that are well known in the art such as a calibration unit, for example. The antenna array 230 may transmit multiple beamforming signals according to the beam architecture used by the wireless standard or carrier.

According to embodiments of the present invention, the conformal antenna array 230 may support any type of beam architecture. A beam architecture relates to a number of sectors in the cell site 130 and a number of beamforming signals per sector. For example, S may be the number of sectors per cell site 130, and b(s) may be the number of beamforming signals for each sector s, where s=1, . . . , S. Therefore, one beam architecture may include any number of sectors per cell site 130 and any number of beamforming signals per sector.

For example, the conformal antenna array 230 may support the GSM standard, which has a beam architecture of 12 sectors per cite site 130 and one beamforming signal per sector. The conformal antenna array 230 may support the HSPA standard, which has a beam architecture of 6 sectors per cite site 130 and two beamforming signals per sector. Also, the conformal antenna array 230 may support the LTE standard, which has a beam architecture of 3 sectors per cite site 130, and four beamforming signals per sector.

For GSM, the BBU 240 generates baseband signals (e.g., 12 baseband signals) that include data streams to be transmitted to the UEs 105 in each of the 12 sectors of the cell site 130 on the downlink communication channel. The beamformer unit 250 receives the baseband signals from the BBU 240, and generates a number of beamforming signals, where each beamforming signal is associated with a different sector in the cell site 130. The number of beamforming signals corresponds to the number of sectors in the beam architecture. The RF modulation unit 260 modulates the RF signals from the beamformer unit 250 to a particular frequency band associated with the standard or carrier.

Figure 7A:
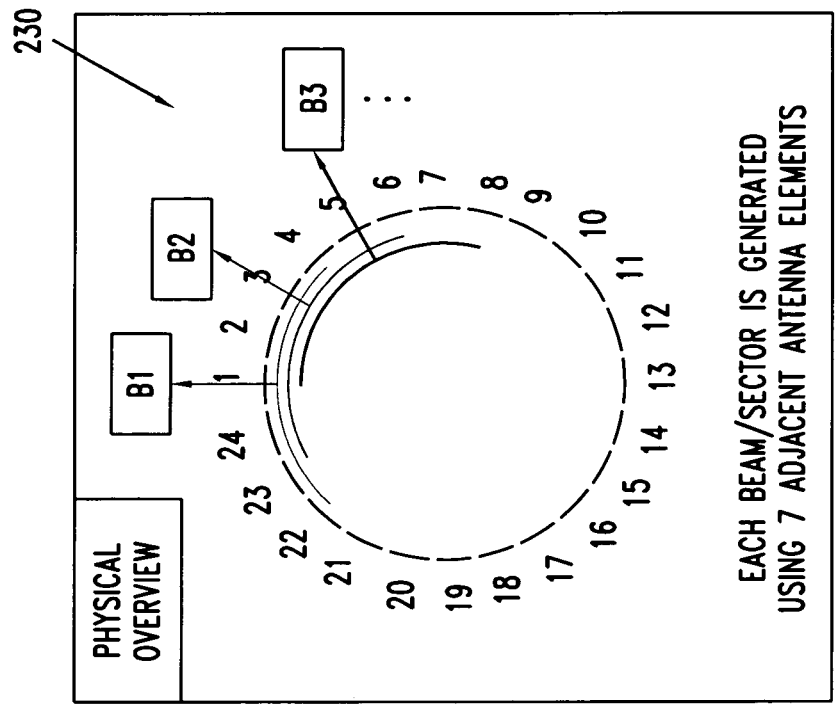
FIG. 7A illustrates a logical block of a beamformer unit according to an embodiment of the present invention.
Figure 7B:
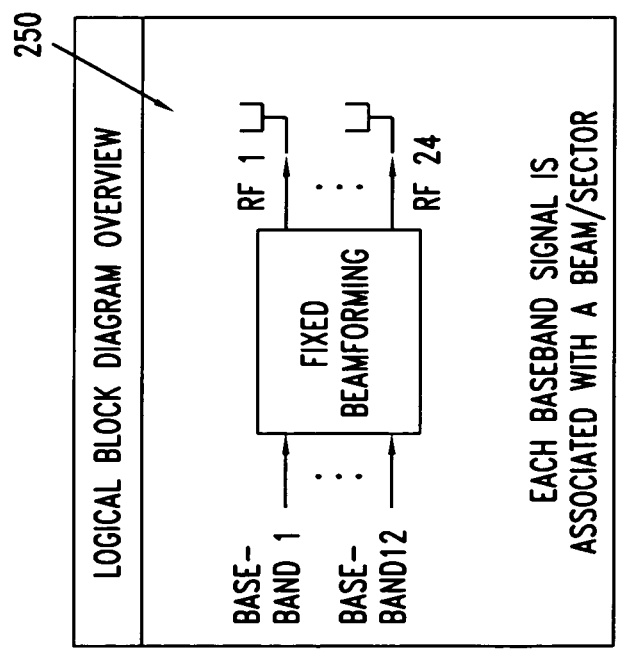
FIG. 7B illustrates a physical overview of antenna elements showing the beamforming signals according to an embodiment of the present invention.

FIG. 7A illustrates a logical block of a beamformer unit 250 according to an embodiment of the present invention and FIG. 7B illustrates a physical overview of the antenna elements 235 showing the beamforming signals according to an embodiment of the present invention.

Referring to FIGS. 7A and 7B, the beamformer unit 250 receives a baseband signal for each of the sectors, and generates a plurality of beamforming signals over the plurality of antenna elements 235 (1-24). Each baseband signal is associated with a beamforming signal (and sector).

However, each beamforming signal is generated using a sub-set of antenna elements. In this case, each beamforming signal is generated using 7 adjacent antenna elements, as shown in FIG. 7B. For example, beamforming signal 1 (B1) is generated using antenna elements 22, 23, 24, 1, 2, 3 and 4, beamforming signal 2 (B2) is generated using antenna elements 24, 1, 2, 3, 4, 5 and 6, and beamforming signal 3 (B3) is generated using antenna elements 2-8. The same is repeated for each of the remaining beamforming signals. Described another way, each beamforming signal includes a plurality of radio-frequency (RF) signals that are generated across the sub-set of antenna elements 235. In the example in FIG. 7A, the beamformer unit 250 generates 24 RF signals based on the 12 baseband signals. The 24 RF signals are used to form each of the 12 beamforming signals. For example, B1 includes the RF signals across antenna elements 22, 23, 24, 1, 2, 3 and 4, B2 includes the RF signals across antenna elements 24 and 1-6, and B3 includes the RF signals across antenna elements 2-8.

As shown in FIG. 7B, the same antenna elements are reused for generating the beamforming signals. For example, at least two beamforming signals from the beamformer unit 250 uses at least two (or more) of the same antenna elements in the subset. Stated another way, the antenna elements in an adjacent beamforming signal are shifted from the previous beamforming signal. Therefore, the RF signals over each antenna element are usually a summation of the RF signal for one particular beamforming signal and the RF signal for another particular beamforming signal (or more). For example, in FIG. 7B, the RF signal of B1 over antenna element 24 and the RF signal of B1 over antenna element 24 are added.

FIG. 8 illustrates an antenna element mapping chart according to an embodiment of the present invention. The chart shows which antenna elements correspond to the beamformer unit 250, which is a continuation of the above discussion. However, embodiments of the present invention encompass any type of antenna mapping. For example, if a different antenna configuration (e.g., hemispherical configuration, etc.) is used, the mapping between the antenna elements 235 and the beamforming signals will change. In addition, if the number of antenna elements 235 is different than 24, the mapping between the antenna element and the beamforming signal will change.

The beamformer unit 250 generates each of the beamforming signals based on respective beamforming coefficients and a respective baseband signal. For example, the beamforming coefficients of B1 may be $A_{22}, A_{23}, A_{24}, A_1, A_2, A_3$ and $A_4$. These beamforming coefficients correspond to antenna elements 22, 23, 24, 1, 2, 3, and 4. The beamformer unit 250 multiplies baseband signal $X_1$ by each of the beamforming coefficients $A_{22}, A_{23}, A_{24}, A_1, A_2, A_3$ and $A_4$ to produce the RF signals for antenna elements 22, 23, 24, 1, 2, 3, 4 for the beamforming signal B1. Similarly, the beamforming coefficients of B2 may be $B_{24}, B_1, B_2, B_3, B_4, B_5, B_6$. The beamformer unit 250 multiplies baseband signal $X_2$ by each of the beamforming coefficients $B_{24}, B_1, B_2, B_3, B_4, B_5, B_6$ to produce the RF signals for antenna elements 24 and 1-6 for the beamforming signal BB. The beamforming coefficients may be fixed or determined adaptively.

Referring back to FIG. 6, the controller 210 operates in a similar manner when the transceiver 200 includes the general antenna configuration, the hemispherical configuration, the antenna configuration that conforms to a deployment area, and the malleable array including at least two different antenna structures. However, the number of overlapping antenna elements used for the multiple beamforming signals, the number of antenna elements 235, and the spacing between each antenna element 235, may change. In addition, in the case of the malleable array, only a single RF modulation unit 260 may be used to drive the malleable array. For example, the beamformer unit 250 may generate respective beamforming signals for each of the two different antenna configurations in the malleable array in the same describe above.

In regards to receiving data on the uplink communication channel, the transceiver 200 in FIG. 6 operates in a similar manner as previously described. However, the RF modulation unit 260 receives the RF signals from the antenna elements 235 of the conformal antenna array 230 and operates as a down converter to baseband at a frequency band specific to the standard or carrier.

Variations of the example embodiments of the present invention are not to be regarded as a departure from the spirit and scope of the example embodiments of the invention, and all such variations as would be apparent to one skilled in the art are intended to be included within the scope of this invention.

What is claimed:

1. A transceiver for communicating data in a cell site of a wireless communication system, the transceiver comprising:
   a conformal antenna array including a plurality of antenna elements, the plurality of antenna elements having a non-linear antenna configuration to occupy at least two dimensions, the non-linear configuration being a malleable antenna configuration that conforms to a deployment area, the plurality of antenna elements having an arrangement such that a spacing between each of the plurality of antenna elements is irregular; and
   a controller configured to transmit multiple beamforming signals using at least two same antenna elements of the plurality of antenna elements.

2. The transceiver of claim 1, wherein the non-linear antenna configuration is a circular configuration.

3. The transceiver of claim 2, wherein the plurality of antenna elements are arranged on a surface of a cylinder.

4. The transceiver of claim 1, wherein the non-linear antenna configuration is a hemispherical configuration.

5. The transceiver of claim 1, wherein the plurality of antenna elements are arranged in at least two different non-linear antenna configurations that are controlled by one controller.

6. The transceiver of claim 1, wherein a spacing between adjacent antenna elements is no greater than half of a wavelength.

7. The transceiver of claim 1, wherein each beamforming signal is associated with a different sector in the cell site, and a number of beamforming signals corresponds to a number of sectors.

8. The transceiver of claim 1, wherein the controller includes:
 a baseband unit configured to generate baseband signals; and
 a beamformer unit configured generate the multiple beamforming signals based on the baseband signals, each beamforming signal includes a set of radio-frequency (RF) signals corresponding to a sub-set of antenna elements of the plurality of antenna elements.

9. The transceiver of claim 8, wherein each baseband signal is associated with a different sector in the cell site.

10. The transceiver of claim 8, wherein at least two beamforming signals generated from the beamformer unit uses at least two of the same antenna elements in the sub-set.

11. The transceiver of claim 8, wherein the beamformer unit is configured to generate a beamforming signal based on beamforming coefficients and a respective baseband signal, each beamforming coefficient corresponding to a different antenna element in the subset.

12. The transceiver of claim 11, wherein the beamformer unit multiplies the respective baseband signal with each beamforming coefficient to generate the RF signals included in one beamforming signal.

13. The transceiver of claim 12, further comprising:
 an RF modulation unit configured to modulate the RF signals from the beamformer unit to a particular frequency band.

14. A transceiver for communicating data in a cell site of a wireless communication system, the transceiver comprising:
 a conformal antenna array including a plurality of antenna elements, the plurality of antenna elements having a non-linear antenna configuration to occupy at least two dimensions, the non-linear configuration being a malleable antenna configuration that conforms to a deployment area, the plurality of antenna elements having an arrangement such that a spacing between each of the plurality of antenna elements is irregular;
 a baseband unit configured to generate baseband signals; and
 a beamformer unit configured to generate multiple beamforming signals based on the baseband signals, each beamforming signal includes a set of radio-frequency (RF) signals corresponding to a sub-set of antenna elements of the plurality of antenna elements,
 the beamformer unit configured to transmit at least two beamforming signals using at least two of the same antenna elements in the sub-set.

15. The transceiver of claim 14, wherein the non-linear antenna configuration is a circular configuration.

16. The transceiver of claim 15, wherein the plurality of antenna elements are arranged on a surface of a cylinder.

17. The transceiver of claim 14, wherein the non-linear antenna configuration is a hemispherical configuration.

18. The transceiver of claim 14, wherein the plurality of antenna elements are arranged in at least two different non-linear antenna configurations that are controlled by one controller.

* * * * *